United States Patent
Bamji

(10) Patent No.: US 8,891,067 B2
(45) Date of Patent: Nov. 18, 2014

(54) MULTIPLE SYNCHRONIZED OPTICAL SOURCES FOR TIME-OF-FLIGHT RANGE FINDING SYSTEMS

(75) Inventor: Cyrus Bamji, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 720 days.

(21) Appl. No.: 13/018,293

(22) Filed: Jan. 31, 2011

(65) Prior Publication Data

US 2011/0188027 A1 Aug. 4, 2011

Related U.S. Application Data

(60) Provisional application No. 61/337,315, filed on Feb. 1, 2010.

(51) Int. Cl.
*G01C 3/08* (2006.01)
(52) U.S. Cl.
CPC .................................... *G01C 3/08* (2013.01)
USPC ............................................ 356/5.01; 356/5.1
(58) Field of Classification Search
USPC ................................................ 356/5.01, 5.1
See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |

(Continued)

FOREIGN PATENT DOCUMENTS

| CN | 101254344 B | 6/2010 |
| EP | 0583061 A2 | 2/1994 |

(Continued)

OTHER PUBLICATIONS

Y. Wang; S. S. R. Ogirala; B. Hu; Han Q. Le; Multi-static networked 3D ladar for surveillance and access control. May 4, 2007; Proc. SPIE 6550, Laser Radar Technology and Applications XII; doi:10.1117/12.719381.*

(Continued)

*Primary Examiner* — Vicente Rodriguez
(74) *Attorney, Agent, or Firm* — Gregg Wisdom; Judy Yee; Micky Minhas

(57) ABSTRACT

TOF system optical power is augmented using auxiliary optical emitter unit(s) that may be a wireless (WOE), or a plug-wired (PWOE). WOE units sense emitted TOF system optical energy $S_{out}$ and emit optical energy $S_{out\text{-}n}$ preferably dynamically synchronized in frequency and in phase to $S_{out}$ as received by the WOE. Each WOE includes at least one optical sensor to detect $S_{out}$, and internal feedback ensuring that frequency and phase of the WOE emitted $S_{out\text{-}n}$ optical energy are dynamically synchronized with frequency and phase of the TOF emitted $S_{out}$ optical energy. PWOE units need no internal feedback but are calibrated by the TOF system to cause a close match between frequency and phase of the PWOE-emitted optical energy with what would be emitted by the TOF system primary optical source. If PWOE(s) are used in isolation, delay difference between PWOE and the TOF primary optical energy source can be software-compensated.

25 Claims, 3 Drawing Sheets

(56) References Cited

U.S. PATENT DOCUMENTS

| | | |
|---|---|---|
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |

(56) References Cited

U.S. PATENT DOCUMENTS

| | | | |
|---|---|---|---|
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,010,316 | B2 * | 8/2011 | Maltseff .................. 702/159 |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,368,876 | B1 * | 2/2013 | Johnson et al. ............ 356/5.01 |
| 2008/0026838 | A1 | 1/2008 | Dunstan et al. |

FOREIGN PATENT DOCUMENTS

| | | |
|---|---|---|
| JP | 07301672 A | 11/1995 |
| JP | 08044490 A1 | 2/1996 |
| JP | 2009168751 A | 7/2009 |
| JP | 2000186928 A | 7/2010 |
| WO | 93/10708 A1 | 6/1993 |
| WO | 97/17598 A1 | 5/1997 |
| WO | 99/44698 A1 | 9/1999 |
| WO | 2009079779 A1 | 7/2009 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Office Action dated Mar. 22, 2013, in Chinese Patent Appl. No. 201180007792.X filed Jan. 31, 2011.

Response to Office Action dated Aug. 6, 2013, Chinese Patent Application No. 201180007792.X.

English translation of the Amended Claims and Summary of the Arguments filed in Response to Office Action dated Aug. 6, 2013, Chinese Patent Application No. 201180007792.X.

Office Action dated Sep. 1, 2014, Japanese Patent Application No. 2012-552046 filed Feb. 1, 2011.

* cited by examiner

MULTIPLE SYNCHRONIZED OPTICAL SOURCES FOR TIME-OF-FLIGHT RANGE FINDING SYSTEMS

RELATION TO CO-PENDING APPLICATION

Priority is claimed from U.S. provisional patent application Ser. No. 61/337,315, filed 1 Feb. 2010, entitled Multiple Synchronized Optical Sources for TOF Range Finding Systems.

FIELD OF THE INVENTION

The invention relates generally to phase-based time-of-flight (TOF) range finding systems, and more specifically to augmenting the source of optical energy used by such systems with at least one additional optical source that is dynamically frequency synchronized and phase synchronized to the source of primary optical energy. Such additional optical source(s) may be wirelessly located remote from the TOF system, or may be removably pluggably attachable to the TOF system itself.

BACKGROUND OF THE INVENTION

Time-of-flight (TOF) systems are known in the art, and include both non-phased based systems such as described in U.S. Pat. No. 6,323,942 "CMOS-Compatible Three-Dimensional Image Sensor IC" (2001), and phase-based systems such as described in U.S. Pat. No. 6,580,496 "Systems for CMOS-Compatible Three-Dimensional Image Sensing Using Quantum Efficiency Modulation" (2003), which patent is incorporated herein by reference as further background material.

FIG. 1A exemplifies a phase-based TOF system 100, for example a system such as described in U.S. Pat. No. 6,580,496. TOF system 100 can be implemented on a single IC 110, without moving parts and with relatively few off-chip components. System 100 includes a two-dimensional array 130 of detectors (or sensors) 140, each of which has dedicated circuitry 150 for processing detection charge output by the associated detector. Collectively a detector 140 and its circuitry 150 comprise a pixel 155. In a typical application, array 130 might include 100×100 pixels 155. IC 110 also includes a microprocessor or microcontroller unit 160, memory 170 (which preferably includes random access memory or RAM and read-only memory or ROM), a high speed distributable clock 180, and various computing and input/output (I/O) circuitry 190.

Under control of microprocessor 160, an oscillator 115 causes a source of optical energy 120 to be periodically energized and emit optical energy $S_{out}$ via lens 125 toward an object target 20. Typically the optical energy is light, for example emitted by a laser diode or LED device 120. $S_{out}$ preferably is a periodic signal with modulation frequency components of perhaps 200 MHz. For convenience, $S_{out}$ may be represented as $A \cdot \cos(\omega t)$. $S_{out}$ typically has low average and peak power in the tens of mW range, which enables emitter 120 to be an inexpensive light source with a relatively narrow bandwidth, e.g., a few hundred KHz. Some of the emitted optical energy $S_{out}$ will be reflected off the surface of target object 20 as returning energy $S_{in}$, which may be represented as $S_{in} = A \cdot \cos(\omega t + \phi)$, where $\phi$ is relative phase shift. Returning energy $S_{in}$ passes through an aperture field stop and lens, collectively 135, and falls upon two-dimensional array 130 of pixel detectors 140 where an image is formed. Note that $S_{in}$ may include ambient energy components in addition to the actively emitted $S_{out}$ components.

Each pixel 155 measures intensity (or amplitude) of received $S_{in}$, and the relative phase shift ($\phi$) between received $S_{in}$ and emitted $S_{out}$, representing a measure of the roundtrip travel distance Z between system 100 and target object 20. For each pulse of optical energy transmitted by emitter 120, a three-dimensional image of a portion of target object 20 is acquired, where phase shift ($\phi$) is analyzed to determine distance Z.

Emitted optical energy $S_{out}$ traversing to more distant surface regions of target object 20 before being reflected back toward system 100 will define a longer time-of-flight than radiation falling upon and being reflected from a nearer surface portion of the target object (or a closer target object). In addition, different values for distances Z will manifest as different magnitudes of relative phase shift ($\phi$). Thus, relative phase shift phase ($\phi$) can provide a measure of the distance Z between system 100 and the target object 20. Detection of $S_{in}$ signals over multiple locations in pixel array 130 results in measurement signals that are referred to as depth images. The acquired data includes luminosity data (e.g., signal amplitude A), and true TOF relative phase shift ($\phi$), to determine distance Z values to surface regions of target objects 20.

In system 100' there will be a phase shift $\phi$ due to the time-of-flight (TOF) required for energy transmitted by emitter 120 ($S_1 = \cos(\omega t)$) to traverse distance z to target object 20, and the return energy detected by a photo detector 140' in array 130', $S_2 = A \cdot \cos(\omega t + \phi)$, where A represents brightness of the detected reflected signal and may be measured using the same return signal that is received by the pixel detector. FIGS. 1B and 1C depict the relationship between phase shift $\phi$ and time-of-flight, assuming for ease of description a sinusoidal waveform with period $T = 2\pi/\omega$.

The phase shift $\phi$ due to time-of-flight is:

$$\phi = 2 \cdot \omega \cdot z/C = 2 \cdot (2\pi f) \cdot z/C$$

where C is the speed of light 300,000 Km/sec. Thus, distance z from energy emitter (and from detector array) to the target object is given by:

$$z = \phi \cdot C/2\omega = \phi \cdot C/\{2 \cdot (2\pi f)\}$$

Various techniques for acquiring and processing three dimensional imaging data acquired TOF systems are known in the art. For example, U.S. Pat. No. 6,522,395 (2003) to Bamji et al. discloses Noise Reduction Techniques Suitable for Three-Dimensional Information Acquirable with CMOS-Compatible Image Sensor ICs.

The effective illumination provided by $S_{out}$ as seen by target object 120 varies inversely with the square of Z. Thus, increasing magnitude of output power from emitter 120 can enhance system 100 performance, providing more accurate measurements over increasing magnitudes of Z. However in some systems emitter 120 may be bonded to IC 110, such that replacing the emitter with a more powerful (higher wattage) device may be difficult.

Thus, there is a need for a method by which one or more additional optical sources could be provided to augment intensity of $S_{out}$ illumination as seen by the target object. Such additional sources could include relatively high powered emitter(s) located perhaps adjacent to system 100, and/or emitter(s) of less power located closer to the target object than the TOF primary source of optical power. However proper operation of the resultant system dictates that optical energy from each additional source be synchronized with optical energy $S_{out}$.

The present invention provides a method and system to provide at least one additional optical source that is synchronized with the optical energy generated by emitter 120 as source energy $S_{out}$. Such additional optical source(s) may be wireless synchronized to the TOF system primary optical source, and/or may be removably attached to the TOF system housing and thus be wired rather than wireless.

SUMMARY OF THE INVENTION

The present invention recognizes that in many applications it is desirable to augment the effective optical power emitted by a phase-based TOF system to direct more optical energy toward at least a region of the target object. Effective optical power augmentation is achieved in one embodiment by including at least one auxiliary wireless optical emitter (WOE) unit that is preferably optically and wirelessly dynamically synchronized in modulation frequency and in phase to the $S_{out}$ emissions from the TOF system. The WOE units are disposed so as to illuminate at least a portion of the target object with their emitted optical energy. The optical power emitted by such units may be less than, greater than, or even the same as the $S_{out}$ optical power emitted by the TOF system. An advantage of relatively low power WOE units is their reasonably small cost and form factor, and the ability to dispose them relatively close to the target object. The effective optical energy illumination provided by such unit(s) disposed close to the target object can be very substantial. Preferably each auxiliary optical emitter is a standalone unit, and may, but need not be, battery operated.

As noted, quality of the depth images acquired by the TOF system is a function of the incoming reflective $S_{in}$ optical energy. Generation of proper depth images requires that all sources of $S_{out}$ optical energy, i.e., the TOF system optical emitter and all WOEs, be dynamically synchronized both with respect to modulation frequency and phase relative to TOF system $S_{out}$ emitted optical energy. Preferably each WOE unit includes a first optical sensor responsive to incoming $S_{out}$ optical energy emitted by the TOF system, an optical emitter that outputs optical energy, a free running voltage controlled oscillator (VCO) nominally operating at the frequency of the TOF oscillator, a second optical sensor responsive to optical energy emitted by the WOE, and a preferably phase lock loop (PLL) system operating in closed loop feedback to force frequency and phase of the optical energy emitted by the WOE to match that of the incoming TOF optical energy $S_{out}$. Within each WOE the frequency of the VCO is dynamically synchronized to the TOF system $S_{out}$ frequency using preferably PLL circuitry, and frequency synchronization is confirmed by sampling the WOE unit emitted optical energy. The phase of the WOE unit emitted optical energy is synchronized with the TOF system $S_{out}$ phase, and phase synchronization is confirmed by sampling the WOE unit emitted optical energy. Preferably, the first optical sensor and the optical emitter in each WOE unit is mechanically swivelable, so as to better detect incoming $S_{out}$ optical energy, and to better direct the unit's emitted optical energy toward the target object. Preferably software executed within the TOF system, preferably with hardware support, can disregard initial time regions of $S_{in}$ signals, during which time regions synchronization lock is not yet attained. In addition, software executed within the TOF system can intelligently assist, as needed, in processing $S_{in}$ information, taking into account, as needed, time needed to dynamically lock frequency and phase for the WOE units, FOV, output power, and other characteristics of individual WOE units. Preferably memory within each WOE unit can store the most recently PLL synchronization parameters to potentially hasten re-synchronization as $S_{out}$ optical energy changes in frequency and/or phase.

In a second embodiment, at least one auxiliary plug-wired optical emitter (PWOE) unit is physically removably attachable to the housing of the TOF system, preferably by a plug connection whose short wire length minimizes propagation delay. The plug connection enables a very short wire length to couple this PWOE to the drive signal to the TOF primary optical emitter. Circuitry within the TOF system examines the delay lag in an image acquired solely using each such PWOE unit, one at a time, and compares to an image acquired solely using the TOF primary optical emitter. The TOF system circuitry can compensate for the delay lag associated with data acquired using optical energy from each PWOE unit used in isolation and without optical energy from the primary optical unit. Alternatively, the TOF circuitry can tune the delay of each PWOE to match the delay of the primary optical unit. Any number of the thus properly delay-compensated or selected PWOE(s) can then be used in parallel with the TOF system primary optical source to increase the amount of optical energy falling upon the target object. A TOF system may employ at least one WOE and at least one PWOE unit, if desired.

Other features and advantages of the invention will appear from the following description in which the preferred embodiments have been set forth in detail, in conjunction with their accompanying drawings.

DETAILED DESCRIPTION OF THE PREFERRED EMBODIMENTS

Quality and resolution of depth images and data acquired by a TOF system depends in part upon magnitude of the optical energy $S_{out}$ emitted by the TOF system. As energy magnitude of $S_{out}$ increases, effective Z range increases, and resolution of the acquired depth data at a given depth Z increases. In some applications, it may be desirable or necessary to increase effective $S_{out}$ optical power illuminating only a portion of the target object. Magnitude of effective $S_{out}$ optical power illumination varies inversely as the square of the distance Z separating the source of $S_{out}$ and the target object. Thus one solution to increasing effective optical power is to reduce the distance Z. This can be accomplished by disposing at least one additional auxiliary optical energy unit (WOE) closer to the target object. The challenge, however, is to ensure that the frequency and phase of the emissions from each WOE are dynamically in synchronism with the frequency and phase of the TOF 100' $S_{out}$ emissions from TOF emitter 120, which is controlled by the TOF master oscillator 115. This challenge can be daunting in that optical energy $S_{out}$ generated by TOF system 100' may exhibit spread spectrum characteristics.

Embodiments of the present invention can provide a TOF system with auxiliary plug-wired optical energy (PWOE) units and/or auxiliary wireless optical energy (WOE) units. PWOE units will be described first with respect to FIG. 2. TOF system 100' may augment optical energy from its primary emitter 120 with one or more PWOE units 210-1, 210-2, with one or more WOE units 220-1, 220-2, etc., or with at least one PWOE unit and at least one WOE unit. Output optical energy from a PWOE unit or from a WOE unit may be greater than, equal to, or less than power of the optical energy $S_{out}$ emitted by TOF system primary source 120. If desired, one or more PWOE units could be used to generate system 100' optical power in lieu of emitter 120.

Figure 2:
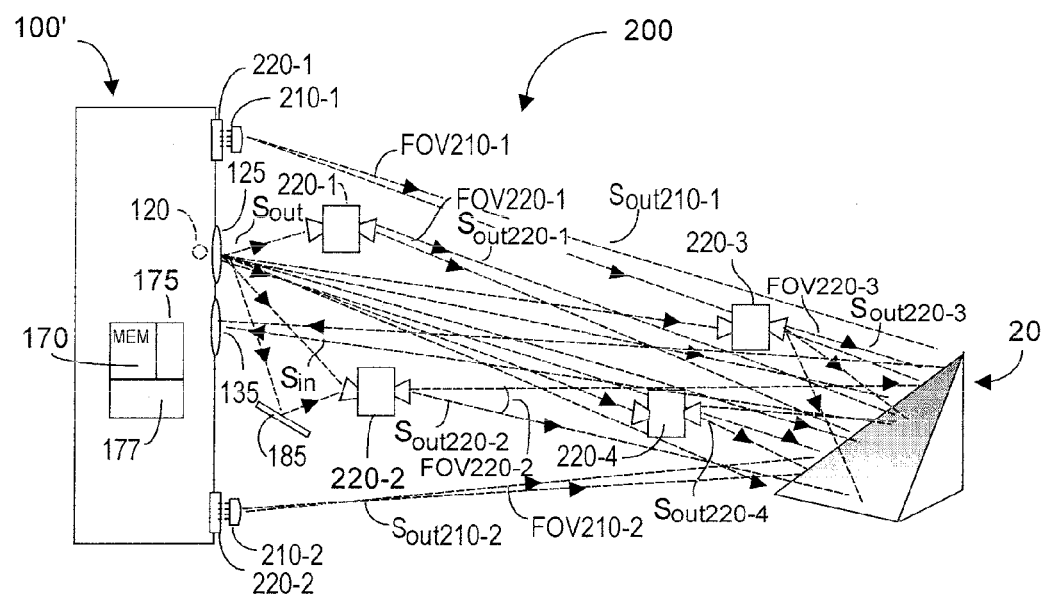
FIG. 2 is a block diagram of a generic phase-based TOF system equipped with auxiliary wireless optical emitter (WOE) units, and with auxiliary plug-wired optical emitter (PWOE) units, according to embodiments of the present invention.

Turning first to auxiliary plug-wired optical emitter (PWOE) units, as shown in FIG. 2, FIG. 2 TOF system 100' has an internal primary source of emitted optical energy 120 that can be augmented with and/or replaced by at least one auxiliary plug-wired optical emitter (PWOE) unit such as 210-1, 210-2. The PWOE units preferably matingly plug into (or unplug from) connectors 220-1, 220-2, which connectors 220-n are mounted on the housing of TOF system 100' adjacent if not exceedingly close to primary optical emitter source 120.

When TOF system 100' is manufactured, primary optical emitter source 120 will have been calibrated to the system. But individual PWOE units will not be so calibrated, and even though relative wire length between the units and circuitry within TOF system 100' will be short, uncalibrated delay times are inherent. Unless corrected, the delay times associated with various of the PWOE units will result in acquired depth data having incorrect Z values.

In one embodiment PWOE units are calibrated against their inherent delay times as follows. Initially TOF system 100' acquires depth data from a known target object 20, using only $S_{out}$ energy emitted by primary optical energy source 120. Next, source 120 is temporarily disabled, and without moving TOF system 100' or target object 20, new depth data is acquired using say $S_{out210-1}$, which is emitted solely by PWOE unit 210-1. When a single PWOE is used without primary optical unit 120, software preferably within the TOF system can compensate for the delay difference of that PWOE, without requiring any additional circuitry.

Alternately software and/or hardware 177 within TOF system 100' can then fine-tune delay for PWOE unit 210-1 to force its acquired data to match the data obtained when using only primary source 120. Once so calibrated, optical energy emitted by PWOE unit 210-1 is substantially indistinguishable to target object 20 from optical energy emitted by primary source 120. The energy seen by target object 20 from the various optical sources will appear to have a common phase and a common frequency. This same calibration procedure can be repeated to individually compensate delay for each PWOE unit with which TOF system 100' is to be used, where preferably module 177 in TOF system 100' so compensates.

Once a PWOE unit is calibrated, its output optical energy is effectively combined in parallel with that of primary source 120. Indeed in some applications it may be desirable to use one or more PWOE units in lieu of using primary source 120. One or more PWOE units may, for example, output substantially more optical power than primary source 120. Of course the power output by a PWOE unit may be the same as or less than the power output by primary source 120.

Consider now embodiments of the present invention in which auxiliary wireless optical emitter (WOE) units such as 220-1, 220-2, 220-3, etc., are used to augment or even replace optical energy generated by TOF system 100' primary source 120. Whereas the PWOE units described above will typically be mounted extremely close to primary optical source 120, the WOE units will typically be disposed away from TOF system 100'.

Consider next use of auxiliary wireless optical emitter (WOE) units. WOE units according to the present invention are more sophisticated than PWOE units. As shown by FIG. 2, embodiments of the present invention augment effective optical power emitted by TOF system 100' by disposing at least one WOE unit 220-1, 220-2, 220-3, 220-4 that is preferably wirelessly and preferably optically and dynamically synchronized in frequency and in phase to the $S_{out}$ emissions from TOF system 100. As noted, optical power emitted by such units may be less than, greater than, or even the same as the $S_{out}$ optical power emitted by the TOF system. An advantage of relatively low power WOEs is their reasonably small cost and form factor, and the ability to dispose them relatively close to the target object. Preferably each WOE is a standalone unit, and may be battery operated. Each WOE will have an output optical energy field-of-view (FOV) that may differ with units having different characteristics. Some embodiments may include reflective surfaces such as mirror(s) 185 to intercept some $S_{out}$ energy from TOF system 100' and reflect same into a WOE unit. Understandably in some applications, ideal location of the various WOE units may be difficult, and reflective surfaces can better accommodate less than idea placement of WOE units.

Figure 1A:
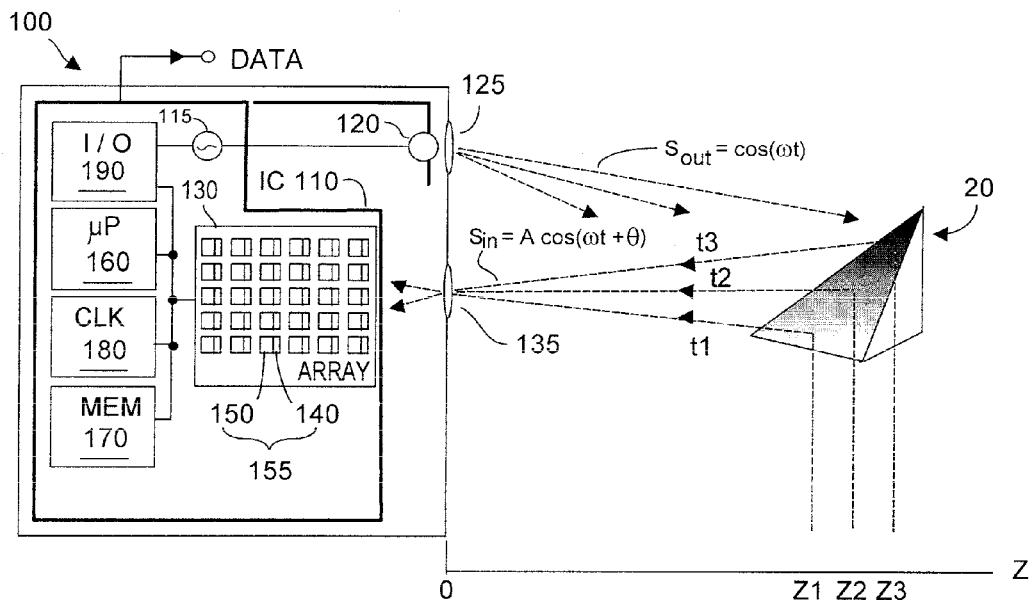
FIG. 1A is a block diagram of a generic phase-based TOF system, according to the prior art.
Figure 1B:
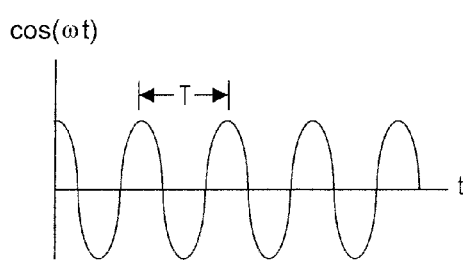
FIG. 1B depicts a transmitted periodic $S_{out}$ signal with high frequency components transmitted by the system of FIG. 1A, according to the prior art.
Figure 1C:
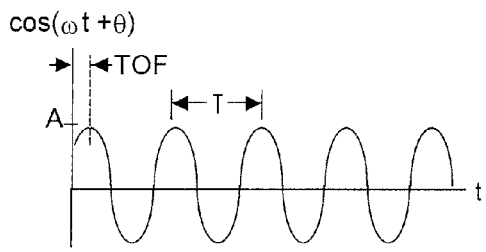
FIG. 1C depicts the return $S_{in}$ waveform with phase-delay for the transmitted signal of FIG. 1B, according to the prior art.

Understandably trade-offs exist between location or position of WOE units and their individual FOVs. If, for example, WOE unit 220-3 may have relatively low output power, perhaps 150 mW, but have a relatively wide FOV. One could, if desired, add a collimator to the optical emitter in WOE unit 220-3 to concentrate more optical energy within a narrower effective FOV. If a FOV were too small, one could add a diffuser to the optical emitter to extend and scatter the emitted light, effectively enhancing the FOV. For the most part, TOF system 100' is the same as TOF system 100 in FIG. 1A, but will preferably include at least one software routine 175 stored or storable in memory 170 that is executable by a processor, e.g., processor 160. Execution of routine 175 facilitates TOF system 100' operation with one or more WOE units, as described herein.

Some locations for WOE units are better than others. In FIG. 2, clearly the path taken by optical energy from TOF 100' directly to target object 20 is less than the combined paths taken by optical energy from TOF 100' to WOE unit 220-1, and from WOE 220-1 to the target object. Better performance is realized if the WOE unit can be disposed on a radial between TOF 100' and the target object 20. When the WOE unit is disposed relatively close to TOF 100', the ideal condition of radiality is generally approximately satisfied. In practice, substantiality radiality may not occur, and preferably software preferably associated with TOF 100' can cause appropriate corrections to be made.

Operating characteristics of TOF systems are generally determined by the application to be carried out. Exemplary system characteristics for a generic TOF system 100' might be perhaps 1 W optical power output from emitter 120, with a TOF system modulation frequency ω may be on the order of perhaps 50 MHz-100 MHz, with data acquired at 30-60 frames/sec. The resultant TOF system will have an effective range of perhaps 3 M. Exemplary WOE units would of course be dynamically synchronized to the same system modulation frequency and would also be dynamically synchronized to have the same phase as the TOF $S_{out}$ emissions. Exemplary optical power output from individual WOEs might be as low as perhaps 100 mW or as high as several watts.

Figure 3:
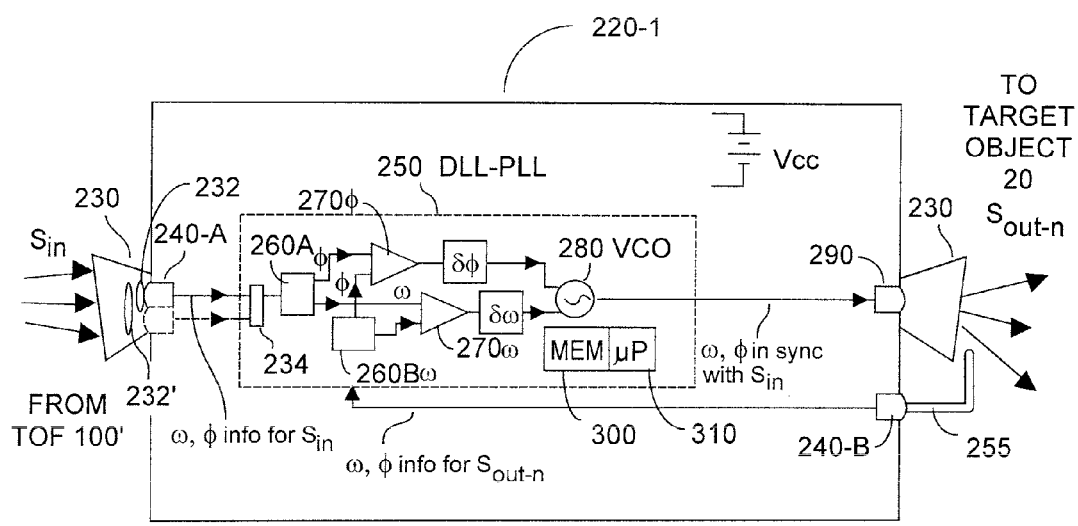
FIG. 3 is a block diagram showing exemplary details of a WOE unit, according to embodiments of the present invention.

FIG. 3 depicts an exemplary WOE 220-$n$, e.g., unit 220-1, or 220-2, or 220-3, 220-4, etc. in FIG. 2. It is a function of each WOE 220-$n$ to receive as an incoming signal $S_{in}$ at least a fraction of the $S_{out}$ optical energy emitted by TOF system 100', and to output optical energy $S_{out-n}$ that is locked in frequency $\omega$ and phase $\phi$ with the incoming signal, $S_{in}$. This functionality preferably is implemented by preferably providing each WOE unit 220-$n$ with a phase lock loop (PLL) system 230. PLL 230 receives as a first input a signal containing $S_{in}$ frequency $\omega$ and phase $\phi$ information, and receives as a second input a signal containing $S_{out-n}$ $\omega$ and phase $\phi$ information. Closed loop feedback causes the frequency $\omega$ and phase $\phi$ of the $S_{out-n}$ optical energy emitted by WOE 220-$n$ to be locked to the frequency $\omega$ and phase $\phi$ of the detected TOF emissions, $S_{in}$. Thus, the $S_{out-n}$ optical energy emitted by each WOE unit replicates in frequency and in phase the detected incoming optical energy $S_{in}$ emitted by TOF system 100'. Gain is realized in that magnitude of $S_{out-n}$ can be greater than magnitude of $S_{in}$ and in that the WOE unit may be placed in closer proximity to the target object than TOF system 100'.

In FIG. 3, optical energy $S_{out}$ from TOF system 100' (denoted as signal $S_{in}$) is detected by at least one optical sensor 240-A, 240-A'. The various 240-A sensors are preferably mechanically mounted with swivel mechanism 250 to facilitate aiming at the TOF system 100', to better detect $S_{out}$ emissions. Looking at the right hand portion of FIG. 3, optical energy emitted by WOE emitter 260 is detected by WOE sensor 240-B, either directly or through use of a fiber optics 270 or the like. Preferably emitter 260 is mechanically mounted with a swivel mechanism 280 to facilitate aiming the $S_{out-n}$ optical energy toward the target object 20, or a region thereon. Swivel mechanisms 250, 280 or the like better enable a WOE unit to enhance and possible maximize magnitude of incoming $S_{out}$ optical energy from the TOF system, and/or to enhance and possibly maximize magnitude of emitted optical energy $S_{out-n}$ from the WOE unit that falls upon the target object. Understandably it is desired to increase the magnitude of optical energy falling upon the target object, which enhanced magnitude of optical energy means a larger amplitude $S_{in}$ signal will be reflected back to the TOF system for detection. Of course optical energy $S_{out-n}$ contributions from the various WOE modules want to have proper modulation frequency and phase, relative to what was emitted by the TOF system. Note that the signal from sensor 240-B contains frequency $\omega$ and phase $\phi$ information relating to the WOE emitted optical energy $S_{out-n}$.

Within PLL 230, a comparator unit 290 receives as inputs both the $S_{in}$ and $S_{out-n}$ signals, and thus receives frequency $\omega$ and phase $\phi$ as to both the incoming optical energy $S_{in}$ and the WOE replicated output optical energy $S_{out-n}$. These signals are compared within comparator 290, and a comparator output signal is coupled to a low pass filter 300. An output signal from filter 300 drives a preferably voltage controlled oscillator 310, whose output frequency $\omega$ and output phase $\phi$ are forced by feedback to be locked to the frequency and phase of $S_{in}$. It is understood that the power output from emitter 260 may differ from the optical power emitted by TOF system emitter 120 (see FIG. 1A).

In this fashion, each WOE unit 220-$n$ outputs optical energy $S_{out-n}$ that is dynamically synchronized in frequency and in phase to the TOF emitted optical energy signal $S_{out}$. As far as the TOF sensor array 130 (see FIG. 1A) is concerned, all incoming optical energy $S_{in}$ may be regarded as though emitted by the TOF emitter 120. In essence, each WOE 220-$n$ receives an input wavefront $S_{out}$ from TOF system 100, and replicates the wavefront by generating an output wavefront $S_{out-n}$ that is synchronized in frequency and in phase with the input wavefront.

As further shown in FIG. 3, each WOE unit 220-$n$ preferably includes a power supply Vcc, e.g., a battery, as well as memory 300 and a processor 310, coupled to optionally execute at least one routine stored in memory. In some embodiments, memory 300 can store the most recent PLL lock parameters for WOE unit 220-$n$. This is advantageous in that frequency and phase synchronization within each WOE can be hastened by dynamically storing each unit's most recent PLL parameters for lock condition. Processor 310 preferably accesses the most recently stored lock data and provides this information to the PLL system 250. PLL system 250 will achieve its own frequency and phase lock, but starting with the most recently stored lock parameters can quicken achievement of lock within each WOE. Generating good depth data within TOF system 100' requires that all $S_{in}$ signals be synchronized in frequency and in phase with respect to the TOF emitted Sout signal. In practice it takes each WOE unit a finite amount of time to generate $S_{out-n}$ that is stably synchronized with respect to frequency $\omega$ and phase $\phi$ of the TOF $S_{out}$ optical emissions. Preferably routine 175 in memory 170 (see FIG. 2) can store the longest, i.e., optimally stable, such lock time information for the WOEs. This information is useable by processor 160 (see FIG. 1A) to effectively instruct TOF system 100' to disregard portions of $S_{in}$ signals that include information from WOE's before stable lock condition was achieved.

Understandably, in practice optical energy $S_{out}$ falling upon 230 and thus unit 220-1 may contain optical energy having multiple phases, due perhaps to multi-pathing and/or contributions from perhaps another TOF system operating in the near vicinity. $S_{out}$ optical energy may, for example, bounce off a wall or furniture in the local environment before falling upon unit 220-1. In one embodiment, incoming $S_{out}$ optical energy is spatially discriminated, e.g., perhaps by being passed through a lens, e.g., lens 232 in FIG. 3. The presence of lens 232 causes only incoming TOF system optical energy rays emanating from a given boresight to focus upon 240-A. In another embodiment, multiple sensors 240-A, 240-A' may be provided, each preferably having its own boresight. This plurality of sensors may share a common lens, e.g., 232', or may have individual lenses such as lens 232 shown with sensor 240-A. These sensors may be implemented upon a common substrate in array-like fashion, and preferably may be phase-based pixels as described in many U.S. patents awarded to Canesta, Inc. of Sunnyvale, Calif. and now assigned to Microsoft, Inc. The plurality of sensors 240-A may be used to form a basic depth image 234. A software routine, e.g., stored in memory 300 associated with WOE 220-1 can preferably intelligently identify and select from image 234 the best suited sensor 240-A, 240-A', etc., whose optical output signal will be used by PLL 250. Alternatively, optical or electromagnetic energy into, within, and out of WOE 220-1 may be steered using other techniques, including without limitation fiber optics, electrical cabling, etc.

In the various embodiments, it is understood that achieving lock within PLL 250 does not occur instantaneously. Thus, to compensate for this inherent delay, within TOF system 100', clock module 180 signals that command start of optical output from primary optical energy emitter or source 120 will issue earlier in time than clock signals controlling signal integration and optical energy detection within array 130. In other embodiments, within the various WOEs, internal memory, e.g., 300, can store previously encountered and observed frequency-phase regimes, and can thus quickly access this information to shorten time needed to lock frequency and phase. In some applications it may be desirable to allow at least one WOE to emit at least some optical energy having a phase other than the zero phase, e.g., to intentionally enable a WOE to "see" reflected optical energy or electromagnetic radiations.

Embodiments other than what has been described may also be used. For example, referring to FIG. 1A and FIG. 2, one might use a first pixel 155 within pixel array 130 to sample incoming $S_{out}$ energy from a WOE. A second pixel 155 within the array could be used to sample TOF system 100' $S_{out}$, perhaps using a fiber optic such as 270. An error between output signals from these two pixel outputs could generate a signal to drive synchronization. As shown in FIG. 3, the various WOEs may (but need not be) be battery operated, and preferably when no optical energy or electromagnetic incoming energy is detected, the various WOEs may shut-down, to conserve operating power. Of course these units will be in a low power consuming standby mode such that detection of incoming energy will cause the WOEs to power on fully again. Optionally, the various WOE operating parameters may be downloaded into the individual units via cable or wirelessly, e.g., RF, or perhaps optically using special modulation from TOF system 100'.

Modifications and variations may be made to the disclosed embodiments without departing from the subject and spirit of the invention as defined by the following claims.

What is claimed is:

1. A phase-based time-of-flight (TOF) system that includes a primary optical source that emits optical energy $S_{out}$ having a modulation frequency ω and a phase φ and a time of flight sensor which detects $S_{in}$, which is at least a fraction of emitted said optical energy that is reflected-back by a target object a distance Z away, and determines said distance Z from a shift in said phase φ in $S_{in}$, said TOF system further including:
    at least one auxiliary optical emitting unit whose output optical energy is substantially indistinguishable to said time of flight sensor from optical energy emitted by said primary optical source;
    said auxiliary optical emitting unit including at least one of a wireless optical emitting (WOE) unit, and a plug-wired optical emitting (PWOE) unit;
    wherein optical energy emitted by each said auxiliary optical emitting unit is substantially indistinguishable to said time of flight sensor in modulation frequency and phase as optical energy $S_{out}$ emitted by said TOF system when reflected by said target object.

2. The TOF system of claim 1, wherein said at least one auxiliary optical emitting unit is a WOE unit disposed to receive a portion of emitted said optical energy $S_{out}$ output by said TOF system, said $S_{out}$ having a modulation frequency and a phase shift as received by said WOE unit, said WOE unit generating output optical energy $S_{out-n}$ dynamically locked to at least one of modulation frequency and phase cp relative to optical energy received by said WOE unit;
    wherein operation of said at least one WOE unit increases effective power of optical energy reflected back toward said TOF system by said target object.

3. The TOF system of claim 1, wherein said at least one WOE unit is disposed in at least one location selected from a group consisting of (a) disposing external to said TOF system, and (b) disposing a distance from said target object less than said distance Z.

4. The TOF system of claim 1, wherein said at least one WOE unit includes:
    means for receiving a fraction of emitted said $S_{out}$ optical energy; and
    means for generating optical energy $S_{out-n}$ synchronizable with at least one of modulation frequency and phase with TOF generated said $S_{out}$ optical energy, as received by said WOE.

5. The TOF system of claim 1, wherein said at least one WOE unit includes:
    a voltage controlled oscillator (VCO);
    a phase-lock-loop (PLL) unit that generates an error signal representing at least one of error in said modulation frequency and error in said phase between said $S_{out}$ and $S_{out-n}$, said error signal coupled in close loop feedback to said means for generating to lock at least one of modulation frequency and phase of $S_{out-n}$ to modulation frequency and phase of said $S_{out}$.

6. The TOF system of claim 1, wherein said at least one WOE includes means for repositioning said WOE unit relative to said TOF system so as to increase at least one of amount of incoming optical energy from $S_{out}$ received by said WOE, and amount of said $S_{now-n}$ optical energy emitted by said WOE falling upon said target object.

7. The TOF system of claim 1, wherein:
    said at least one auxiliary optical emitting unit is a PWOE unit, removably coupleable to said TOF system adjacent said primary optical source; and
    said TOF system includes means for calibrating said PWOE unit for delay relative to said primary optical source.

8. The TOF system of claim 7, wherein said means for calibrating includes:
    means for acquiring a primary depth image of said target object using only optical energy $S_{out}$ emitted by said primary optical source;
    means for acquiring a depth image of said target object using only optical energy emitted by each said PWOE unit, one unit at a time;
    means for comparing, one at a time, said primary depth image with depth images acquired using optical energy emitted by each said PWOE unit; and
    means for compensating delay associated with each said PWOE unit to minimize a difference between said primary depth image and a depth image acquired with optical energy emitted by each said PWOE unit after said compensation; said means compensating using software without adjusting a delay of a PWOE unit.

9. The TOF system of claim 7, wherein said means for calibrating includes:
    means for acquiring a primary depth image of said target object using only optical energy $S_{out}$ emitted by said primary optical source;
    means for acquiring a depth image of said target object using only optical energy emitted by each said PWOE unit, one unit at a time;
    means for comparing said primary depth image with depth images acquired using optical energy emitted by each said PWOE unit; and
    means for changing the delay of said PWOE unit such that a difference in depth data between at least one pixel in each acquired depth image is minimized.

10. The TOF system of claim 5, wherein said system includes at least one WOE unit that includes sensors receiving at least a fraction of optical energy $S_{out}$, said WOE unit including:

means for forming a depth image using data acquiring by at least a first sensor and a second sensor within said WOE unit, and means for identifying from an output signal from each said sensor, which sensor output to use in driving said PLL.

11. The TOF system of claim 10, wherein said at least one WOE further includes memory storing best lock data for using in synchronizing said PLL.

12. A method of dynamically enhancing detection performance of a phase-based time-of-flight (TOF) system that emits optical energy $S_{out}$ having a modulation frequency $\omega$ and a phase $\phi$ and a sensor array which detects $S_{in}$, which is at least a fraction of emitted said optical energy that is reflected-back by a target object a distance Z away, and determines said distance Z from a shift in said phase $\phi$ in $S_{in}$, the method including:

using optical energy from at least one auxiliary optical emitting unit whose output optical energy is indistinguishable to said sensor array from optical energy emitted by said TOF system;

said auxiliary optical emitting unit including at least one of a wireless optical emitting (WOE) unit, and a plug-wired optical emitting (PWOE) unit;

wherein optical energy emitted by each said auxiliary optical emitting unit is indistinguishable to said sensor array in modulation frequency and phase as optical energy $S_{out}$ emitted by said TOF system when reflected by said target object.

13. The method of claim 12, including disposing said at least one auxiliary optical emitting (WOE) unit to receive a portion of emitted said optical energy $S_{out}$ generated by said TOF system, said $S_{out}$ having a modulation frequency and a phase shift as received by said WOE unit, said WOE unit generating output optical energy $S_{out-n}$ dynamically locked to at least one of modulation frequency and phase $\phi$ relative to optical energy received by said WOE unit;

wherein operation of said at least one WOE unit increases effective power of optical energy reflected back toward said TOF system by said target object.

14. The method of claim 12, further including disposing said at least one WOE unit in at least one location selected from a group consisting of (a) disposing external to said TOF system, and (b) disposing a distance from said target object less than said distance Z.

15. The method of claim 12, further including providing said at least one WOE unit with:

means for receiving a fraction of emitted said $S_{out}$ optical energy; and means for generating optical energy $S_{out-n}$ synchronizable with at least one of modulation frequency and phase with TOF generated said $S_{out}$ optical energy, as received by said WOE.

16. The method of claim 12, further including providing said at least one WOE unit with a closed-loop feedback system to force synchronization of at least one of modulation frequency and phase of $S_{out-n}$ to modulation frequency and phase of said $S_{out}$.

17. The method of claim 16, wherein said closed-loop feedback system includes:

a voltage controlled oscillator (VCO);

a phase-lock-loop (PLL) unit that generates an error signal representing at least one of error in said modulation frequency and error in said phase between said $S_{out}$ and $S_{out-n}$, said error signal coupled in close loop feedback to said means for generating to lock at least one of modulation frequency and phase of $S_{now-n}$ to modulation frequency and phase of said $S_{out}$.

18. The method of claim 12, further including repositioning said WOE unit relative to said TOF system so as to increase at least one of amount of incoming optical energy from $S_{out}$ received by said WOE, and amount of said $S_{now-n}$ optical energy emitted by said WOE falling upon said target object.

19. The method of claim 12, wherein said at least one auxiliary optical emitting unit is a plug-wired optical emitting (PWOE) unit, removably coupleable to said TOF system adjacent said primary optical source; and providing said TOF system with means for calibrating said PWOE for delay relative to said primary optical source.

20. The method of claim 19, wherein said means for calibrating includes:

acquiring a primary depth image of said target object using only optical energy $S_{out}$ emitted by said primary optical source;

acquiring a depth image of said target object using only optical energy emitted by each said PWOE unit, one unit at a time;

comparing said primary depth image with depth images acquired using optical energy emitted by each said PWOE unit; and compensating delay associated with each said PWOE unit such that a difference in depth data between at least one pixel in each acquired depth image is minimized.

21. The method of claim 17, wherein said TOF system includes at least one WOE unit having sensors that receive at least a fraction of optical energy $S_{out}$, said WOE unit carrying out the following steps:

forming a depth image using data acquiring by at least a first sensor and a second sensor within said WOE unit; and identifying from an output signal from each said sensor, which sensor output to use in driving said PLL.

22. The method of claim 19, wherein said means for calibrating carries out the following steps:

acquiring a primary depth image of said target object using only optical energy $S_{out}$ emitted by said primary optical source;

acquiring a depth image of said target object using only optical energy emitted by each said PWOE unit, one unit at a time;

comparing said primary depth image with depth images acquired using optical energy emitted by each said PWOE unit; and changing delay of said PWOE unit such that a difference in depth data between at least one pixel in each acquired depth image is minimized.

23. The method of claim 12, wherein said auxiliary optical emitting unit is at least one said PWOE unit, the method further including;

disabling said primary source from outputting optical energy; and operating said TOF system so as to acquire data using solely optical energy output by at least one said PWOE unit.

24. The method of claim 17, wherein said TOF system includes at least one WOE unit that includes sensors receiving at least a fraction of optical energy $S_{out}$, the method further including:

forming, within said at least one WOE unit, a depth image using data acquiring by at least a first sensor and second sensor within said WOE unit; and identifying, within said at least one WOE unit, from an output signal from each of said sensor, which sensor output to use in driving said PLL.

25. The method of claim 24, further including storing within each said WOE unit, best lock data for using in synchronizing said PLL.

\* \* \* \* \*